United States Patent [19]

Nasco, Jr.

[11] Patent Number: 4,788,711

[45] Date of Patent: Nov. 29, 1988

[54] APPARATUS AND METHOD FOR A CELLULAR FREEWAY EMERGENCY TELEPHONE SERVICE

[75] Inventor: Michael Nasco, Jr., Laguna Hills, Calif.

[73] Assignee: Cellular Communications Corporation, Houston, Tex.

[21] Appl. No.: 801,410

[22] Filed: Nov. 25, 1985

[51] Int. Cl.[4] .......................................... H04M 11/00
[52] U.S. Cl. ...................................... 379/59; 455/33; 455/313; 379/63
[58] Field of Search ............... 379/56, 59, 60; 455/33, 455/89, 100

[56] References Cited

U.S. PATENT DOCUMENTS

| | | | |
|---|---|---|---|
| 3,844,840 | 10/1974 | Bender | 136/89 |
| 4,176,254 | 11/1979 | Tuttle et al. | 179/5 R |
| 4,219,698 | 8/1980 | Birilli et al. | 179/5 P |
| 4,577,182 | 3/1986 | Millsap et al. | 340/539 |
| 4,639,914 | 1/1987 | Winters | 370/110.1 |
| 4,724,538 | 2/1988 | Farrell | 379/59 |

Primary Examiner—Robert Lev

Attorney, Agent, or Firm—George F. Bethel; Patience K. Bethel

[57] ABSTRACT

A self-contained cellular emergency roadside call box is disclosed without the use of external telephone lines. The call box is solar powered with battery storage and comprises a controller coupled to a cellular transceiver. The controller is also coupled to a solar array and battery which is recharged through the controller. The call box communicates through a radio-telephone link established by the cellular transceiver to a cellular telecommunication system. The cellular telecommunication system includes a call site controller and mobile telephone switching terminal. Each call box comprises a plurality of status subcircuits for monitoring conditions such as battery condition and transmitter status. The call box communication and the status are processed by a micro processor which generates appropriate commands required by the cellular transceiver. Information can be transmitted bidirectionally between each of the call boxes and the communication applications processor. An interactive flow of information is exchanged with the call box and the functional condition is monitored.

10 Claims, 10 Drawing Sheets

APPARATUS AND METHOD FOR A CELLULAR FREEWAY EMERGENCY TELEPHONE SERVICE

BACKGROUND OF THE INVENTION

1. Field of the Invention

The invention relates to the field of cellular telephone equipment and in particular to solar powered telephone call boxes using a cellular telephone system to radiotelephonically communicate from a plurality of fixed roadside sites.

2. Description of the Prior Art

Emergency roadside call boxes have become increasingly important and productive elements in providing roadside security and emergency assistance in the metropolitan areas in the United States and throughout the world. Originally, such roadside emergency call boxes were hardwired to conventional telephone land lines. However, the installation of such telephone land lines substantially escalates the installation and maintenance costs of such emergency roadside telephone boxes. In order to overcome this limitation, the prior art devised emergency telephone call boxes which use a radio transmission link for communications. Cannalty et al., "Emergency Communications System", U.S. Pat. No. 3,939,417; and Wisniewski, "Emergency Calling System", U.S. Pat. No. 3,492,581 show such systems. Power for these call boxes is provided by a rechargeable battery included within their housings. However, such prior art battery operated systems either required the units to be coupled to a source of electrical power for trickle-charging or required the periodic replacement or recharging of the battery packs through mobile roadside service. Again, although savings were realized in installation costs by using battery powered units, the maintenance or service costs of such systems often prohibited their use.

Furthermore, in the past radiotelephone communications within geographic areas were realized using a process based on a single transmitter and antenna. This method of communication limits the number of calls that can be placed in a geographic area and limits the size of the area that can be covered with a given amount of equipment. However, with the recent advent of cellular telephone technology, these limitations, which were characteristic of the prior art single transmitter systems, no longer exist.

Therefore, what is needed is a design and method of using a radio linked emergency call box which is adaptable to cellular telephone technology and which is characterized by low installation and service costs.

BRIEF SUMMARY OF THE INVENTION

The invention is a system for providing an emergency call box service comprising a plurality of emergency call boxes, wherein each call box further comprises: a controller; a cellular transceiver coupled to the controller; a battery coupled to the controller for providing power to the controller and transceiver; and a solar array for generating power coupled to the controller for recharging the battery. Also included in the system is a cellular telecommunications subsystem in radiotelecommunication with each of the plurality of emergency call boxes. A communication applications processor is coupled to the cellular telecommunications subsystem for processing data received in part from the plurality of emergency call boxes. The communications applications processor communicates through the cellular telecommunications subsystem with selected ones of the plurality of emergency call boxes. By reason of this combination of elements the plurality of emergency call boxes can be installed and maintained at low cost and are capable of arbitrarily programmable interactive operations.

The system further comprises interoffice local telephone exchanges coupled to the communication applications processor wherein communication between the plurality of emergency call boxes can be selectively coupled to the local telephone exchanges under control of the communication applications processor.

The controller comprises a plurality of status subcircuits. Each status subcircuit monitors a predetermined status parameter of the corresponding call box.

The system further comprises a circuit for selectively communicating the predetermined parameters as monitored by the plurality of status subcircuits to the communication applications processor. The parameters monitored by the status subcircuits include battery power level, and the physical condition of the corresponding call box indicative in part of whether call box has been struck.

The controller further comprises a circuit for receiving and processing information from the communication applications processor to initiate operations in the controller.

The controller still further comprises a circuit for adjusting the volume of transmitted and received audio information.

The controller has a timing mechanization included within its digital circuitry. The timer provides the capability to measure predetermined elapsed time periods. The timer mechanism is used in the following ways:

(1) To limit each call to a maximum duration (e.g. 10 minutes;

(2) To terminate a call if there is no conversation for a predetermined period of time (e.g. one minute); and (3) To cause each call box to automatically initiate a call and to report its operational status on a periodic basis (e.g. once every 24 hours).

In the event that the telephone handset is left off the hook, the automatic time out will terminate the call and will thus save battery power. Should this occur, the call box is automatically reactivated and another emergency call is placed should the hook switch be operated to the on-hook status followed by an off-hook status.

Stated in yet another way the invention is an emergency roadside call box comprising: a controller; a cellular transceiver coupled to and controlled by the controller; a battery for powering the controller coupled to the controller and transceiver; and a solar array coupled to the controller for recharging the battery. By reason of this combination of elements an emergency roadside call box can be installed and maintained at low cost.

The controller comprises a plurality of status subcircuits for monitoring corresponding selective parameters of the controller, and a circuit for interrogating the plurality of status subcircuits for operationally responding to the parameters as monitored by the status subcircuits.

The plurality of the subcircuits comprise at least a subcircuit for monitoring a user request for emergency transmission, battery condition, presence of a communication transmitted to and from the call box, physical integrity of the call box.

The call box further comprises a circuit for selectively communicating the corresponding plurality of parameters of the call box to an off-site recipient.

The call box still further comprises a circuit for receiving information generated off-site and a circuit for initiating an operation of the call box in response to the received off-site information.

The controller comprises a circuit for conserving power from the battery when an emergency communication is not desired, and a circuit for adjusting audio gain for audio information transmitted and received by the call box.

The invention can still further be characterized as a method in an emergency roadside call box, where the call box is battery powered and coupled through a radio-telecommunication link to a cellular telecommunication system and communication applications processor. The method comprises the steps of reading a plurality of call box status parameters. Next follows the step of selectively performing a remedial routine in response to the step of reading the plurality of status parameters dependent upon the condition of each corresponding parameter. Thereafter follows the step of selectively entering an emergency call routine wherein a cellular telecommunication transceiver within the call box is powered up and bidirectional voice communication is established through the cellular telecommunication system to the communication applications processor. By virtue of this method, remotely powered emergency call boxes in radio-telecommunication with the communication applications processor are operationally maintained.

The invention can still further be characterized as an apparatus in combination with a cellular radiotelephone for generating information compatible with the cellular radiotelephone in a solar powered emergency call box. The invention comprises a first circuit for determining a plurality of status conditions relating to the emergency call box; a second circuit for controlling power usage of the emergency call box to minimize power usage; and a third circuit for processing the status conditions determined by the first circuit and responsive to at least the status conditions controlling the second circuit. The third circuit also selectively bidirectionally generates and receives cellular radiotelephone compatible signals under programmable control. The third circuit is coupled to the first and second circuit and to the cellular radiotelephone.

The invention is best understood in the context of an illustrative example as shown in the following drawings wherein like elements are referenced by like numerals.

The invention and its various embodiments may be better understood by now turning to the following description.

DETAILED DESCRIPTION OF THE PREFERRED EMBODIMENT

Before considering the detailed circuitry in the cellular call box and its method of operation, first generally consider the environment in which the call box is used and how it is utilized during normal operation.

Figure 1:
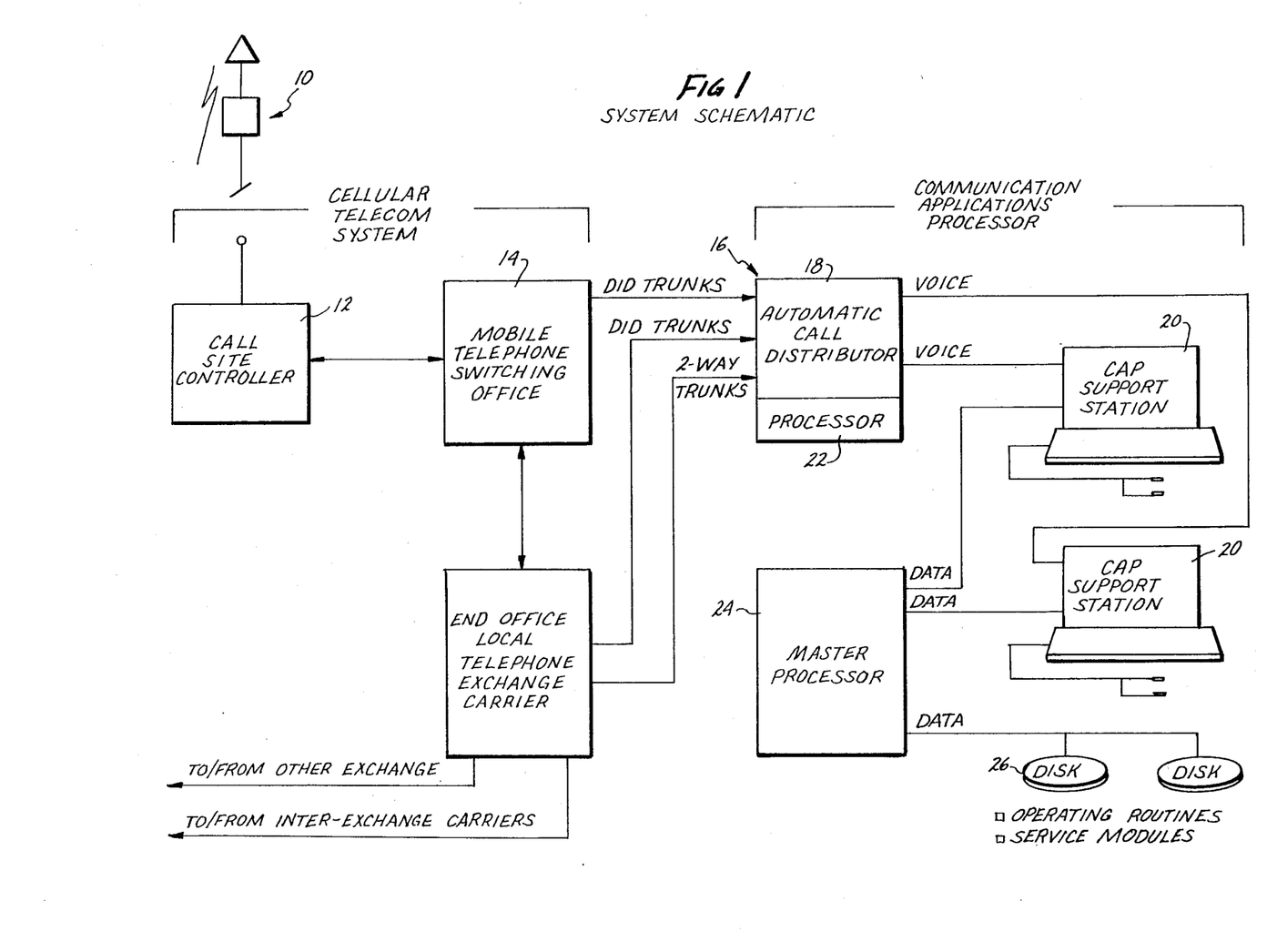
FIG. 1 is a block diagram of a system in which the call box incorporating the invention is included.

Turn now to FIG. 1. When an emergency occurs along a roadside, the affected user will locate the nearest emergency call box, generally denoted by reference numeral 10. The user will lift the handset which will cause call box 10 to automatically dial a preprogrammed number to the freeway emergency telephone system control center. The call is transmitted via a radio link to a local cell site transceiver 12 over a selected one of 21 channels according to which channel is the strongest cellular channel available. This selection of communication channels by transceiver 12 and mobile telephone switching office 14 is well known in the art of cellular communications and will not be further described. Local cell site transceiver 12 is connected with a mobile telephone switching office 14 by wireline trunks. Mobile telephone switching office 14, which is an automatic terminal, then provides call box identity confirmation and predialed access to the control center, which includes a communications applications processor generally denoted by reference numeral 16. Mobile telephone switching office 14 can also connect call box 10 to a conventional telephone switching exchange 15 in response to commands from the control center so that three party telephone conference calls can be provided or the call from call box 10 simply handed off to another telephone station.

The incoming calls will be uniquely identified with a specific emergency call box. The identification will then be used to access a data base and all information corresponding to that call box will be retrieved in the applications processor 16. An automatic call distributor 18 will connect the incoming call to an available operator at a communications applications processor (CAP) sort center 20. A human operator answers the call and the communication which to this point has been digital will be followed by voice communication. Specific call box information will be displayed on the screen in response to an automatic call distributor processor 22 coupled with a master processor 24 which causes specific information to be brought up from the data base to the appropriate support station 20. Such information includes the location of the call box, nearest access roads, local terrain and appropriate local emergency numbers. Support station 20 and master processor 24 interactively communicate so that all subsequent actions which are undertaken by the operator can be logged for archival, management and planning use. Archival discs 26 are coupled to and controlled by master processor 24 for mass data storage.

Figure 2:
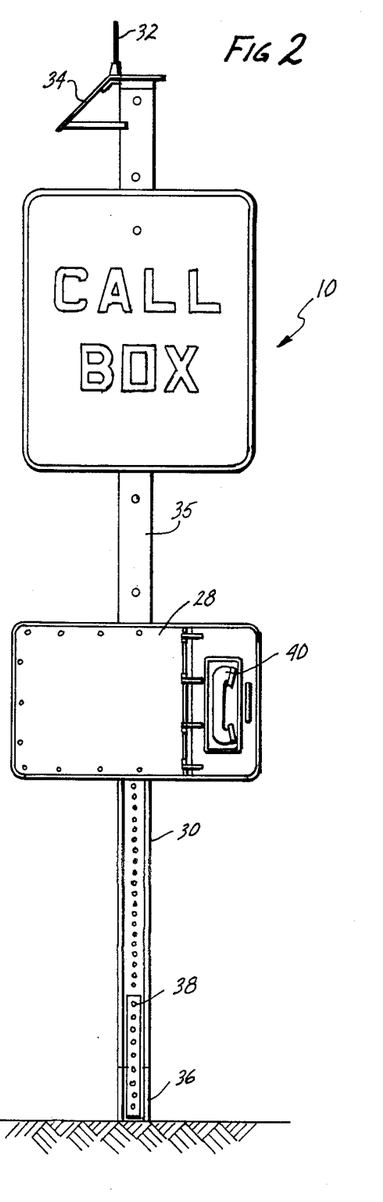
FIG. 2 is a front elevational depiction of the call box as installed at a roadside site.
Figure 3:
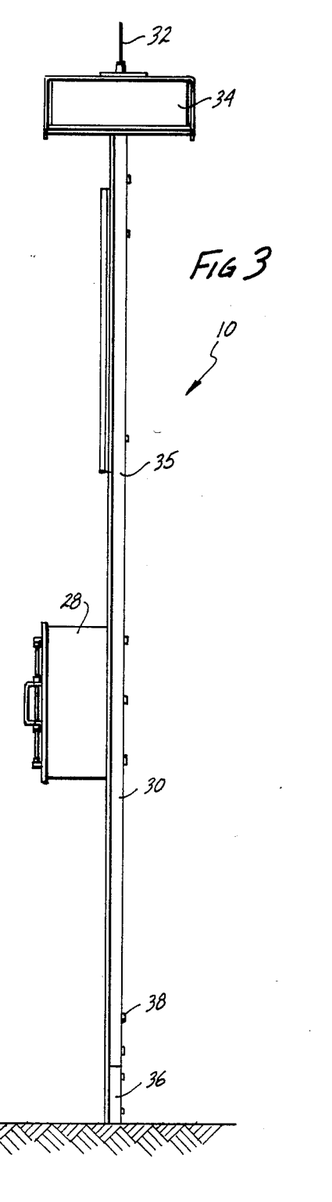
FIG. 3 is a side elevational view of the call box of FIG. 1.

Turn now specifically to call box 10 as shown in FIG. 2 in front elevational view and in FIG. 3 in side elevational view. Call box 10 is a completely self-contained unit requiring no connection with external power lines or telephone cables. Box 10 is solar powered, is designed for use with a cellular telephone system, and is characterized by low-cost installation with quick repair or replacement.

As shown in FIGS. 2 and 3, call box 10 comprises a housing 28 mounted on a road standard 30. Housing 28 includes the call box controller, radio transceiver and battery described and shown diagrammatically in the following Figures. The three watt radio transceiver is coupled to a conventional collinear antenna 32 with 3 dB of isotropic gain mounted on the top of standard 30. Also mounted with antenna 32 is a solar panel 34. Solar panel 34 as described below is coupled to circuitry within main housing 28 and is used to recharge the batter included within the housing. In particular, solar array 34 is made of thirty-four matched silicon solar cells with peak power rated at 10.5 watts. The panel is glass laminated and held in a metal frame to protect it from dirt, moisture and impact. Approximately 2.2 watt hours per day is generated on the average by the solar panel 34, which is equivalent to the amount of power for 45 minutes of constant air time, generally estimated to be equal four to five average roadside emergency calls. Standard 30 is coupled to a ground anchor 36 to embed it into the site. Ground anchor 36 and standard 30 are coupled together by brake plate 38 seen in FIG. 2 so that, if a vehicle collides with standard 30, brake plate 38 will bend, retain standard 30 to the ground anchor 36, and allow standard 30 to be folded over instead of being snapped over the hood and thrust through the windshield of the oncoming vehicle. Standard 30 is generally U-shaped so that the coupling antenna and power lines between housing 28 and solar array 34 antenna 32 are laid in the U-shaped channel of standard 30 and can be covered or weather sealed by protective plate 35. The entire unit therefore comprises a sealed and weatherproof assembly.

The three watt cellular transceiver enclosed within main housing 28 is a conventional Motorola cellular transceiver sold under the trademark, DYNA-TAK 2000. The details of operation of the transceiver are only implicitly included in this description and will not be expressly discussed except to the extent necessary for a fully illustrated description. Further details of the transceiver of the illustrated embodiment can be found in the published user's manual, entitled DYNA T.A.C, Cellular Mobile Telephone, 800 MHz Transceiver, available from Motorola Technical Writing Services at 1301 E. Algonquin Rd., Schaumburg, Ill. 60196 which is expressly incorporated herein by reference.

Although details of the transceiver are incidental to the invention, a general description is provided here for completeness of explanation. First consider the receive circuitry of the transceiver. In the transceiver discussed in the illustrated embodiment, radio signals in a predetermined range are selected by a 6-pole bandpass filter. The modulated receive signal is then passed to a preamplifier. A 3-pole filter, which further bandpass filters the receive signal, is coupled to the output of the preamplifier. A first mixer is coupled to the 3-pole filter. An injection signal is generated by a receiver synthesizer and mixes with the receive signal to provide a first IF signal. The IF signal is then coupled to an IF board. The IF signal (45 Mhz) is coupled to a buffer amplifier whose output is coupled to a 2-pole crystal filter which passes the signal on to a second buffer amplifier. The output of this buffer amplifier is coupled to a second 2-pole filter. The output of the second 2-pole filter is coupled to a circuit which includes a second mixer, an IF amplifier, a receiver signal strength indicator, and a FM detector. A second conversion and detection is executed in this circuit and its output is an audio signal which is coupled to an audio/logic board. On the audio/logic board the audio receive signal is conditioned in a conventional manner.

An audio signal from the handset is coupled to the radio via a transmit audio hybrid on the audio/logic board. This hybrid comprises a buffer and a 300 Hz to 3 kHz bandpass filter. The output from the bandpass filter of the transmit audio hybrid is fed to a 2:1 compressor comprised of by one half of a single IC compander located on the audio/logic board. The compander dynamically condenses the audio signal, which is expanded 1:2 by the cell site controller to the original dynamic range. The output of the compressor is fed back into the transmit audio hybrid, which contains circuitry for preemphasis, limiting, filtering, audio muting, and a summing amplifier to combine the transmit audio signal with data, supervisory audio tones and other control signals before outputting the signal to the synthesizer digital board. The transmit audio signal is coupled to the modulation input of a sidestep VCO on the syntheziser board. The output of the VCO, a modulated 30 MHz signal, is coupled to a buffer whose output is coupled to one input of a sidestep mixer. The injection input on the mixer is provided with a signal which is an output frequency doubled from the receive VCO. The output of the mixer is a modulated RF signal. The RF signal is then coupled through a 3-pole filter, and amplifier before being coupled to a RF power amplifier.

The frequency synthesizer comprises a receiver VCO, a synthesizer digital board, and an exciter board. The operating frequencies in the radio are all derived from the receiver VCO phase-locked loop. This is comprised of a dual modulus prescaler, a programmable PLL IC, a charge pump, loop filter, and receiver VCO hybrid. This loop is controlled by a channel select line from the logic circuitry which serially loads the channel select data into the programmable PLL IC. One output of the receiver VCO goes through a frequency tripler and is fed to the injector doubler hybrid used in the first mixer of the RF receive circuitry. The other output from the receive VCO is coupled to a frequency doubler on the exciter boar and serves as the input signal to the sidestep mixer.

Further details and schematics of all the above circuitry can be found in the Motorola User's manual referenced above.

The transceiver signals which are referenced most often in the disclosure of the illustrated embodiment are the handset signals. The handset includes a cradle microprocessor which provides an interface between the microprocessor of the handset and the microprocessor of the transceiver logic unit. Digital communication is effectuated through the digital signals C DATA, T DATA and R DATA. Data carried by the bus convention include keypad and fluorescent display information for the handset, display information for the cradle control/indicator board, and other various control signals and commands between the control unit and transceiver logic unit. Only the more relevant of these signals will be discussed below. Logic gates are provided in conjunction with the bus signals to gate either timing information or data depending on the state of a control line INT SELECT. The handset processor uses this circuitry to determine if the information on the T DATA line is actual data or merely a timing pulse. C DATA and T DATA, or C DATA and R DATA (the choice depending on the direction of information flow) will be logical complements during data transmission. When they are not so related, they will signify timing information, i.e. the reset or idle states. Communications with these signals is on a three wire bidirectional bus. Data is communicated in an address-then-data serial word format. At the beginning of communication the bus direction is established. During message transmission each data state is followed by an idle state with a reset state entered after the last data bit of the message. Further details of the bus protocol are described in the Motorola User's manual referenced above.

Keypad data is communicated from the handset via column and row signals which are then used with an internal look-up table to identify the keypad button which was pushed.

Figures 4, 12:
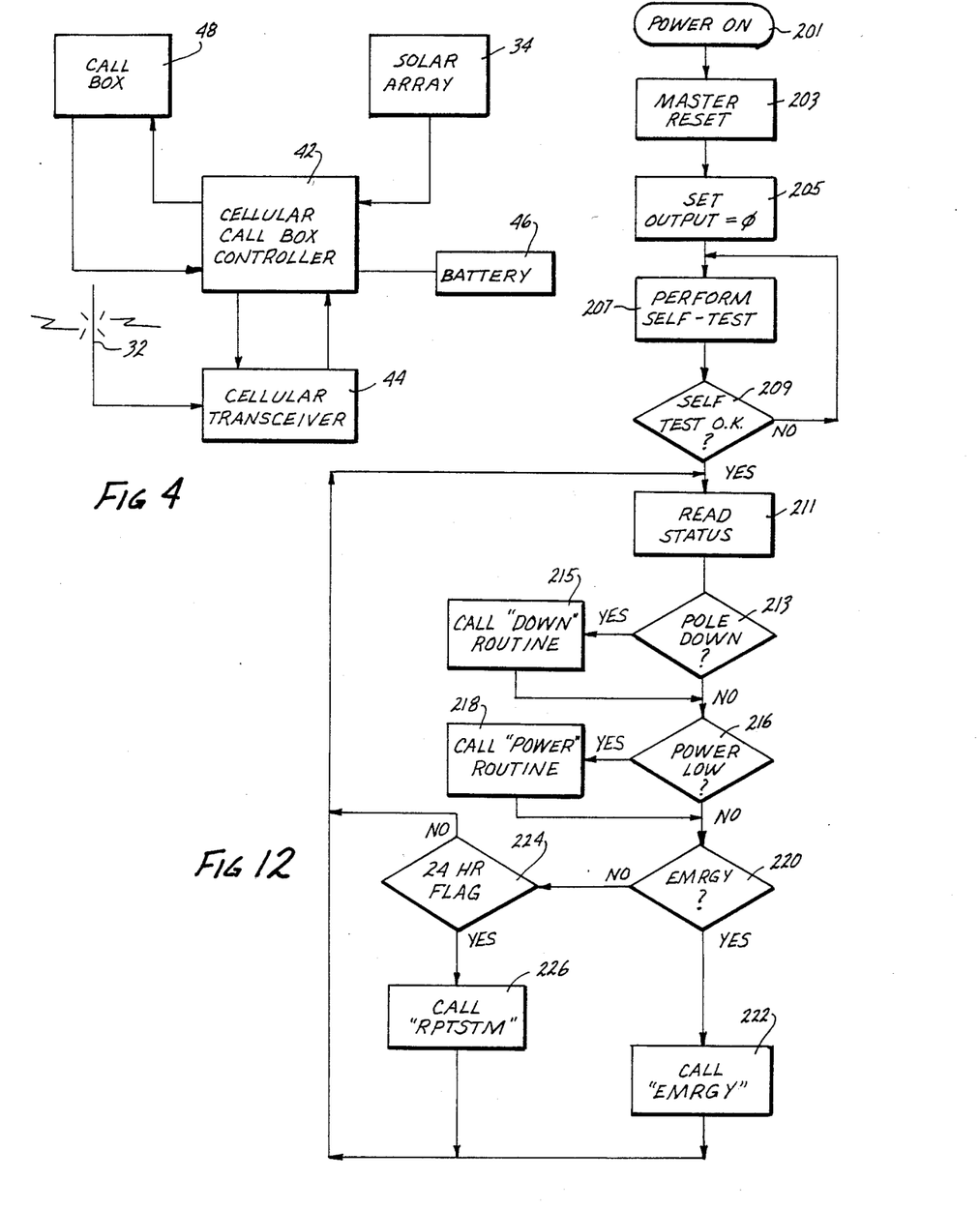
FIG. 4 is a block diagram of including the controller in the call box and its associated system elements.
FIG. 12 is a flow diagram illustrating the operation of the controller.

Handset 40 is diagrammatically depicted in FIG. 2. No further detailed discussion of the transceiver will be undertaken except to such extent as such details affect the operation of the cellular call box controller also included in housing 28. The controller is a single board circuit which can be easily removed from a modular pin connector and a new board inserted for easy field service. The controller comprises the logic and circuitry necessary to control the entire operation of call box 10. Turning to FIG. 4, a diagrammatic depiction of the elements within call box 10 is shown. Cellular call box controller 42 serves as the central unit to which solar array 34, battery 46 and any additional call box switches or input/output functions 48 are coupled. Similarly, cellular transceiver 44 is coupled to controller 42 and antenna 32 in turn is coupled to cellular transceiver 44.

Before describing the circuitry of controller 42, consider first the functions which controller 42 performs. Included among, but not limited to these functions are:

(1) controlling operation sequences for user friendly adaptation;

(2) automatically powering the transceiver when handset 40 is lifted;

(3) automatically dialing the preprogrammed number or alternatively any one of a plurality of numbers corresponding to one of a corresponding plurality of activated switches or buttons (not shown in the Figures);

(4) automatically powering down after a preset, preprogrammed time period or after hang-up of handset 40;

(5) controlling and adjusting necessary voltage level changes in audio and logic circuits;

(6) controlling and regulating all timing functions to integrate the various portions of the assembly;

(7) controlling and regulating the recharging rates from solar array 34;

(8) controlling all power for the entire assembly depicted in FIG. 4 in a manner designed for the most efficient conservation and use of power;

(9) interfacing to transceiver 44; and (10) providing necessary logic and interface for optional controller functions and future enhancements such as slow scan video or specialized data links.

Controller 42 is built around a microprocessor 118 described in connection with FIG. 8. A number of signals indicative of the status of call box 10 are coupled to a data bus 116 as described in FIG. 7 to which microprocessor 118 is coupled and are generated by a plurality of status circuits described in FIGS. 5 and 6. Microprocessor 118 generates a number of discrete control signals through a decoder 130 (FIG. 8) for the control of these status circuits and control signals which are utilized in a decoder tree in FIG. 9 to provide key pad and other cellular control signals to cellular telephone transceiver 44.

Input and output to cellular telephone transceiver 44 is completely effectuated by the keypad signals shown coupled to the input/output bus in FIG. 9 and by the digital signals, C DATA, T DATA, and R DATA described below in connection with microprocessors 118 and 166. Cellular telephone transceiver 44 communicates with microprocessor 118 through a second or interfacing microprocessor 166 described in FIG. 10. Both microprocessors 118 and 166 control the transmit and receive audio level control circuitry shown in FIG. 11. The overall operation of microprocessor 118 is summarized by the flow chart of FIG. 12.

Figure 5:
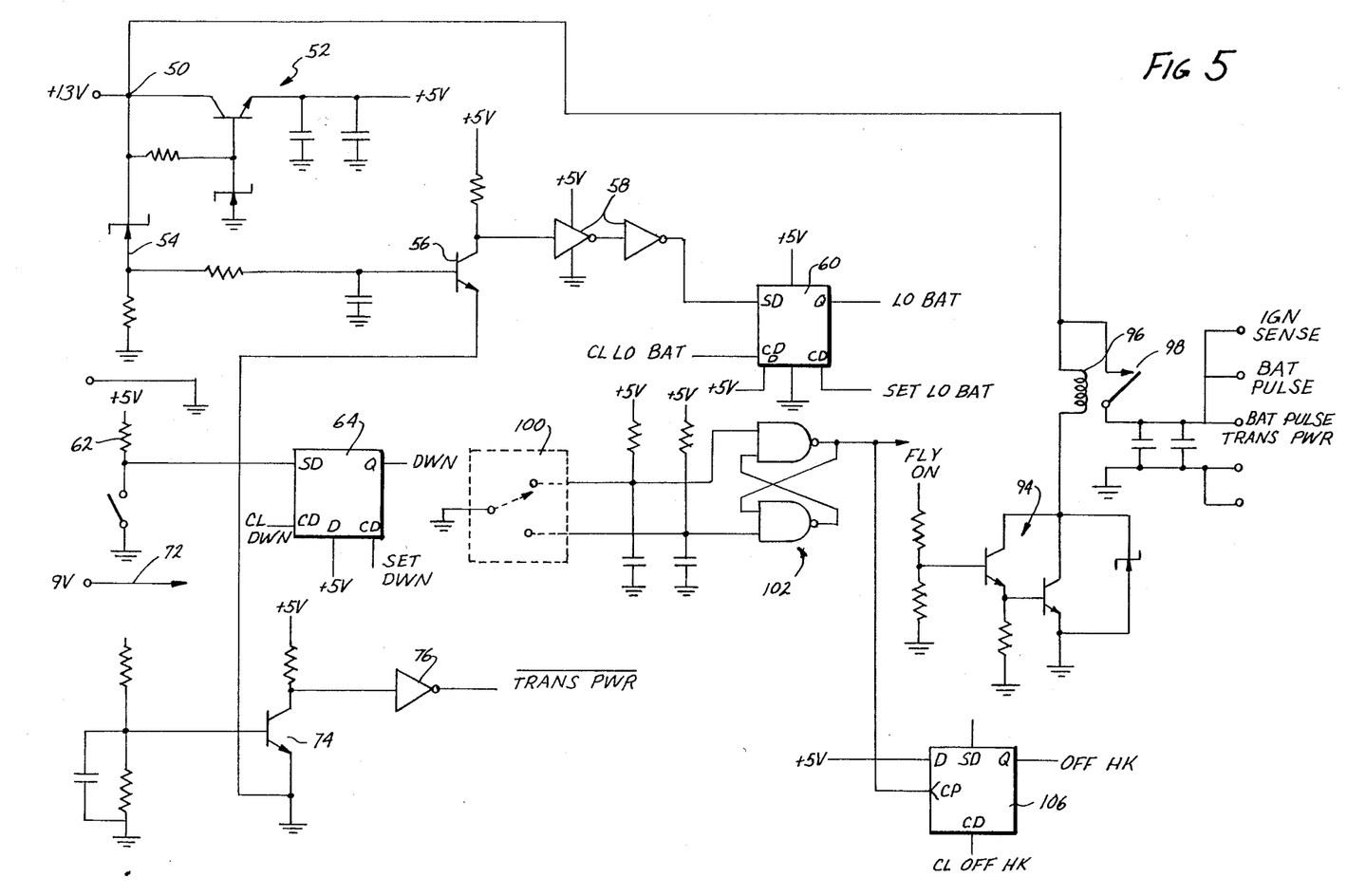
FIG. 5 is a schematic diagram of status subcircuits included in the controller.
Figure 6:
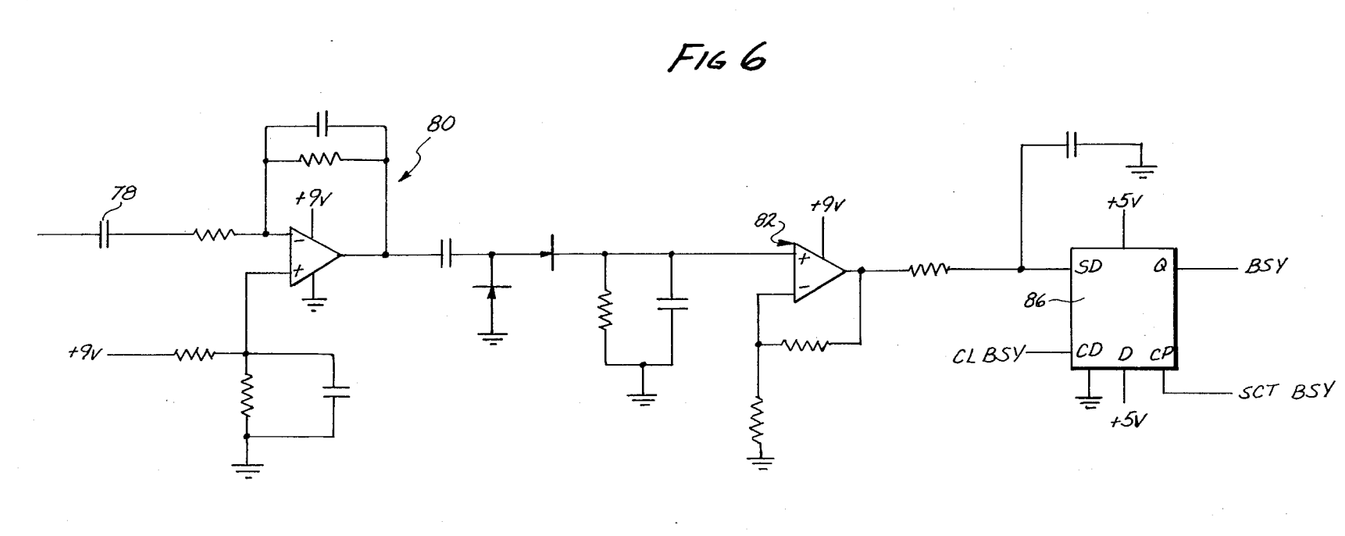
FIG. 6 is a schematic diagram of another status subcircuit.
Figure 7:
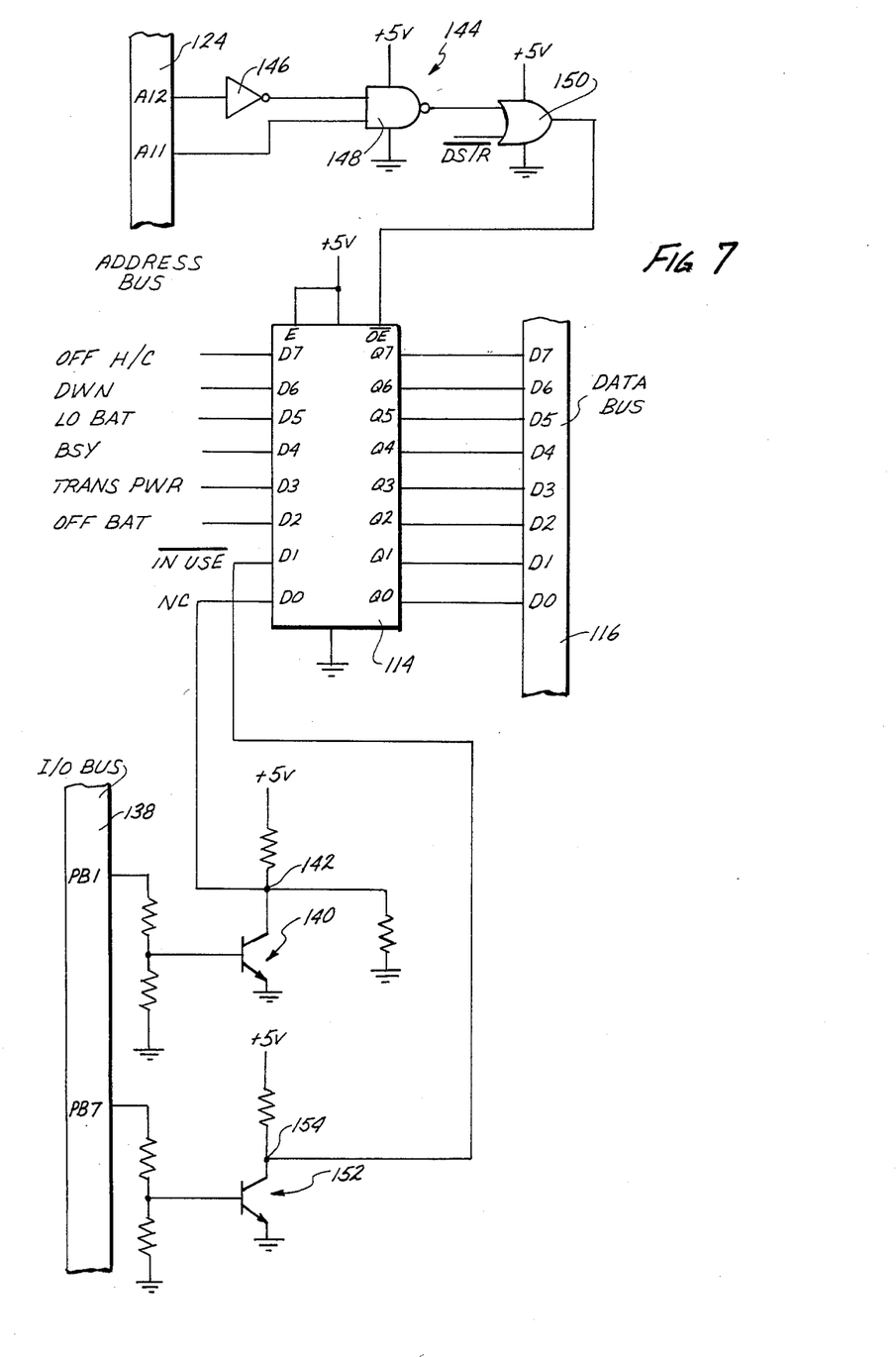
FIG. 7 is a schematic diagram of a circuit to read the status data.

Turn now to FIG. 5 wherein the operation of these functions can be provided by the circuitry illustrated. FIGS. 5-7 are schematics of several circuits which are controllably used to sense a number of status conditions of call box 10. For example, the charged condition of battery 46, the physical integrity of call box 10, the presence of information on the communication channel, the status of handset 40, and the condition of the transmitter are all monitored and selectively reported by means of the circuitry which will now be described in connection with the following Figures.

Consider first the battery condition circuit depicted in FIG. 5. Battery 46 is coupled to node 50. A conventional voltage regulator, generally denoted by reference numeral 52 converts the 13 volts D.C. to 5 volts for use throughout the logic circuitry as indicated. The battery voltage at node 50 is monitored by a conventional zener diode 54. If the voltage is sufficient, transistor 56, whose input is coupled to the anode of diode 54, will be biased on and its output coupled through two inverters, collectively denoted by reference numeral 58, to the set input terminal, SD, of a clocked latch 60. The output, Q, of latch 60 is provided with the signal, inverted LO BAT (low battery), which is utilized in subsequent circuitry as described below. Whenever LO BAT is true, a predetermined low battery voltage or state of battery discharged is indicated. The clock input, CP, of latch 60 is provided with a signal, SET LO BAT (set low battery). Latch 60 is cleared by a signal, CL LO BAT (clear low battery), coupled to the clear terminal, CD, of latch 60.

Consider now the circuitry in FIG. 5 which monitors the physical condition of call box 10, namely whether standard 30 is down on the ground. A mercury tilt switch 62 is coupled between the five volt supply and ground and is normally closed. However, should the pole be struck, or otherwise tilted, switch 62 will open as shown in FIG. 5. When switch 62 opens, a high or true signal will be coupled to the set terminal, SD, of clocked latch 64 whose output, Q, is the signal, DWN (down), representing that the pole is down. The clock input, CP, is the signal, SET DWN (set down), and latch 64 is cleared at its clear terminal, CD, by the signal CL DWN (clear down).

Turn now to the circuitry in FIG. 5 used to monitor the status of the rf transmitter. When transceiver 44 is turned on, 9 volts are applied to node 72. This in turns on transistor 74 whose output is coupled through inverter 76 to provide the signal, inverted TRANS PWR (transmitter power), indicative that the transmitter is powered up. Again, TRANS PWR is used in circuitry to be described below as a status signal indicative of the operation of call box 10.

Consider now the circuitry in FIG. 5 used to selectively power up the rf transmitter, which as a primary power user, is normally off. A signal, RLY ON (relay on), generated by means described below, is applied to a Darlington pair, generally denoted by reference numeral 94, to selectively energize a relay 96. When relay 96 is energized in response to RLY ON, the 13 volts of power at node 50 is coupled through contacts 98 to a plurality of power terminals IGN SENSE, BAT PLUS, BAT PLUS TRANSCEIVER POWER, utilized elsewhere in the circuitry as an operative means of powering up transceiver 44. These power voltages are particular to the Motorola transceiver assumed in the illustrated embodiment and are thus not further discussed here.

Turning your attention to the circuitry of FIG. 6 consider now the status of the operation of handset 40. The audio portion of the signal from handset 40 is coupled through capacitor 78 to a peak-to-peak detector, generally denoted by reference numeral 80. The output of peak-to-peak detector 80 is coupled through a buffer, generally denoted by reference numeral 82, to the set input, SD, of clocked latch 86. The output, Q, of latch 86 is the signal, BSY (busy), which indicates that information, conversation, or at least an audio signal of some sort is being provided to handset 40. The clock input, CP, of latch 86 is the signal SET BSY (set busy) and latch 86 is cleared at its clear terminal, CD, by the signal, CL BSY (clear busy).

The means for originating various status signals now having been described, the primary status signal, namely the lifting of the handset off its hook switch, can be considered. Conventional telephone hook switch 100 in FIG. 5 senses the lifting of handset 40. One terminal of the switch 100 is coupled to ground and the remaining terminal is coupled to a debounce NAND gate latch, generally denoted by reference numeral 102. The output of latch 102 is the status signal, OFF LAT (off latch), which is also used as a clocking signal for clocked latch 106. The input, D, of latch 106 is coupled to the 5-volt power supply so that upon receipt of a clock pulse, OFF LAT, output Q of latch 106, the signal, OFF HK (off hook), goes high. Latch 106 is cleared at its clear terminal, CD, by a signal, CL OFF HK (clear off hook). Thus once the handset has been taken off hook, the circuitry will be able to remember that this has occurred even if placed back on hook until latch 106 is cleared by program control through CL OFF HK. This allows the program to recognize that a call was attempted and to enter a call ready status for a predetermined time regardless of the actual hook condition.

Turn now to FIG. 7. The various status signals described in connection with FIGS. 5 and 6, OFF HK, DWN, LO BAT, BSY, TRANS PWR, and OFF LAT are each provided as inputs to an encoder 114. The output of encoder 114 is coupled to a data bus 116 as a parallel 8-bit word described in more detail in connection with FIG. 8. The remaining portions of the circuitry of FIG. 7 will be described below.

Figure 8:
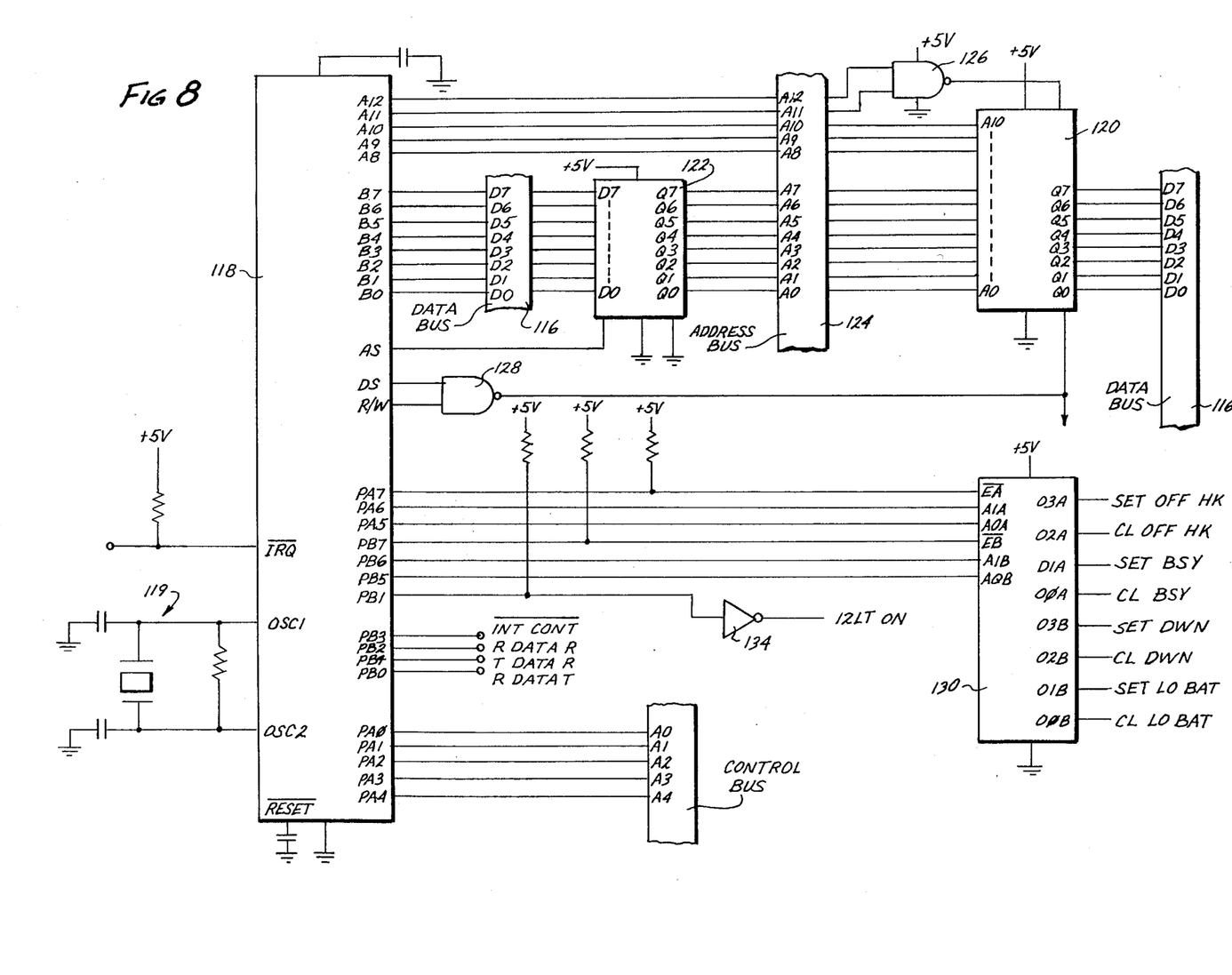
FIG. 8 is a schematic diagram of a programmable microprocessor incorporated in the controller.

Turning to FIG. 8, the encoded word in data bus 116, which is diagrammatically shown throughout the circuitry as appropriate, is coupled to inputs B0-B7 of microprocessor 118, which is the operational programmed microprocessor of controller 42. Microprocessor 118 in the illustrated embodiment is a Motorola 6805 CMOS device which is characterized by very low power consumption. Microprocessor 118 is clocked by a conventional external crystal controlled clocking circuit, generally denoted by reference numeral 119. The program for microprocessor 118 is stored within an external EPROM memory 120. Memory 120 is accessed by microprocessor 118 through terminals B0-B7 and A8-A12, which provide a thirteen-bit access word. Terminals B0-B7 are used during the first half cycle of processor 118 as the lower eight bits of the address and during the second half cycle as a data input-output. Therefore, during the memory fetch, the lower eight bits of the address are coupled through data bus 116 to a bit latch 122 under the control of the address strobe signal from terminal AS of processor 118. Thereafter, all thirteen bits of the address are coupled to address bus 124. The address inputs A0-A10 of memory 120 are thus coupled to address bus 124 and memory 120 enabled by address bits A11 and A12 through NAND gate 126 and strobed by the output of NAND gate 128. Memory 120 is selectively strobed in a read or write cycle according to software control through the read/write terminal, inverted R/W, and data strobe terminal DS of microprocessor 118 which are provided as the inputs to NAND gate 128.

Upon power up and reset the internal address register of microprocessor 118 is set at the highest address of 2K EPROM memory 120. The program is stored in two kilobytes of memory. Thus A12 and A11 are provided as the inputs to NAND gate 126 whose output is coupled to the inverted chip enable terminal, CE. Thus the two highest address bits serve as an address enable. The control and timing of microprocessor 118 with respect to memory 120 is conventional and will not be further detailed beyond that just outlined. At any rate, memory 120 is appropriately strobed and stored information is then read from outputs Q0-Q7 onto data bus 116. The signals data strobe, DS, and the read/write signal, R/W, from microprocessor 118 are similarly coupled to the inputs of NAND gate 128, whose output then serves as an output enable signal coupled to the inverted output enable terminal of EPROM memory 120. Thus, data from memory 120, as well as encoder 114, is appropriately made available to microprocessor 118 over data bus 116.

Outputs PA0-PA7 and PB0-PB7 are input/output ports of microprocessor 118 which in the present embodiment are used only as output terminals which are selectively accessed through a program control. Consider now the various outputs provided at these terminals. PA5-PA7 and PB5-PB7 are coupled to the inputs of decoder 130. The signals at the outputs of PA5-PA7 correspond respectively to two encoded bits designated as A0A and A1A and an inverted enable signal, EA. Similarly, signals PB5-PB7 include respectively two encoded bits A0B and A1B together with an inverted enable signal EB. These data bits and their respective enable signals are thus coded according to conventional means into a plurality of control signals as illustrated in FIG. 6. For example, the signals CL OFF HK, SET BSY, CL BSY, SET DWN, CL DWN, SET LO BAT and CL LO BAT which were described in connection with various status latches of FIG. 4 are generated by microprocessor 118 in combination with decoder 130. The various latches are thus clocked and cleared at the appropriate times under software control as the status of call box 10 queried.

Outputs PA0–PA4 of microprocessor 118 are coupled to a control bus 132 to respectively generate control signals A0–A4 whose use will be better described in connection with FIG. 10 in relation to the manipulation of transceiver 44.

The output of PB1 of microprocessor 118, which is active low, is coupled to an inverter 134 whose output 136 is a signal, RLY ON, used to power Darlington pair 94 in FIG. 5 in order to power up transceiver 44.

PA7, PB7, and PB1 are each pulled high through a resistor in the case where the lines float so that decoder 130 and the transceiver power up relay are affirmatively maintained disabled unless clearly pulled active low by an appropriate output on each of these lines.

The outputs of PB0–PB3 of microprocessor 118 are the signals, return data transmit, R DATA T; receive data receive, R DATA R; true data receive, T DATA R and inverted interrupt control, INT-CONT, which are specific input and output control signals used to provide necessary control functions for transceiver 44. Coupling directly to the input/output ports PB0–PB3 of microprocessor 118 gives the microprocessor the ability to directly respond to and to manipulate a transceiver if desired. However, in the present embodiment, these control ports are not specifically used for the Motorola transceiver illustrated.

Returning to FIG. 7, output PB1 of microprocessor 166, to be described below, is also coupled to an input/output bus 138. PB1 is coupled from input/output bus 138 to an inverter, generally denoted by reference numeral 140. The inverted PB1 signal is applied to node 142 as the signal, SVC (service), indicating that the transceiver has established radiotelephone contact with a ground station. The signal, SVC, is then coupled to one of the inputs of encoder 114 and used as a conditional signal to generate the eight bit status words coupled from encoder 114 to data bus 116.

The output PB7 of microprocessor 166, to be described below, is similarly coupled to input/output bus 138 to an inverter generally denoted by reference numeral 152. Output 154 from inverter 152 is the inverted signal, IN USE, which is used to signify that a call has been placed or is in process. Thus IN USE similarly can be used as a conditional signal in decoder 114 to prevent inappropriate transmission of a status word to data bus 116.

Encoder 114 is also coupled to the two highest address bits A11 and A12 from address bus 124 through a series of logic gates, generally denoted by reference numeral 144. More particularly, A12 is inverted by inverter 146 and coupled together with address signal A11 to the inputs of NAND gate 148. The output of NAND gate 148 is logically combined in OR gate 150 with the output of NAND gate 128, the inverted signal DS/R. The output of OR gate 150 in turn is coupled to the inverted output enable terminal, OE, of encoder 114. Therefore, the output word from encoder 114 is coupled to data bus 116 according to the logic provided by gates 144. This logic prevents the placement of a status word on data bus 116 at the same time that the program is being read from memory 120.

Figure 9:
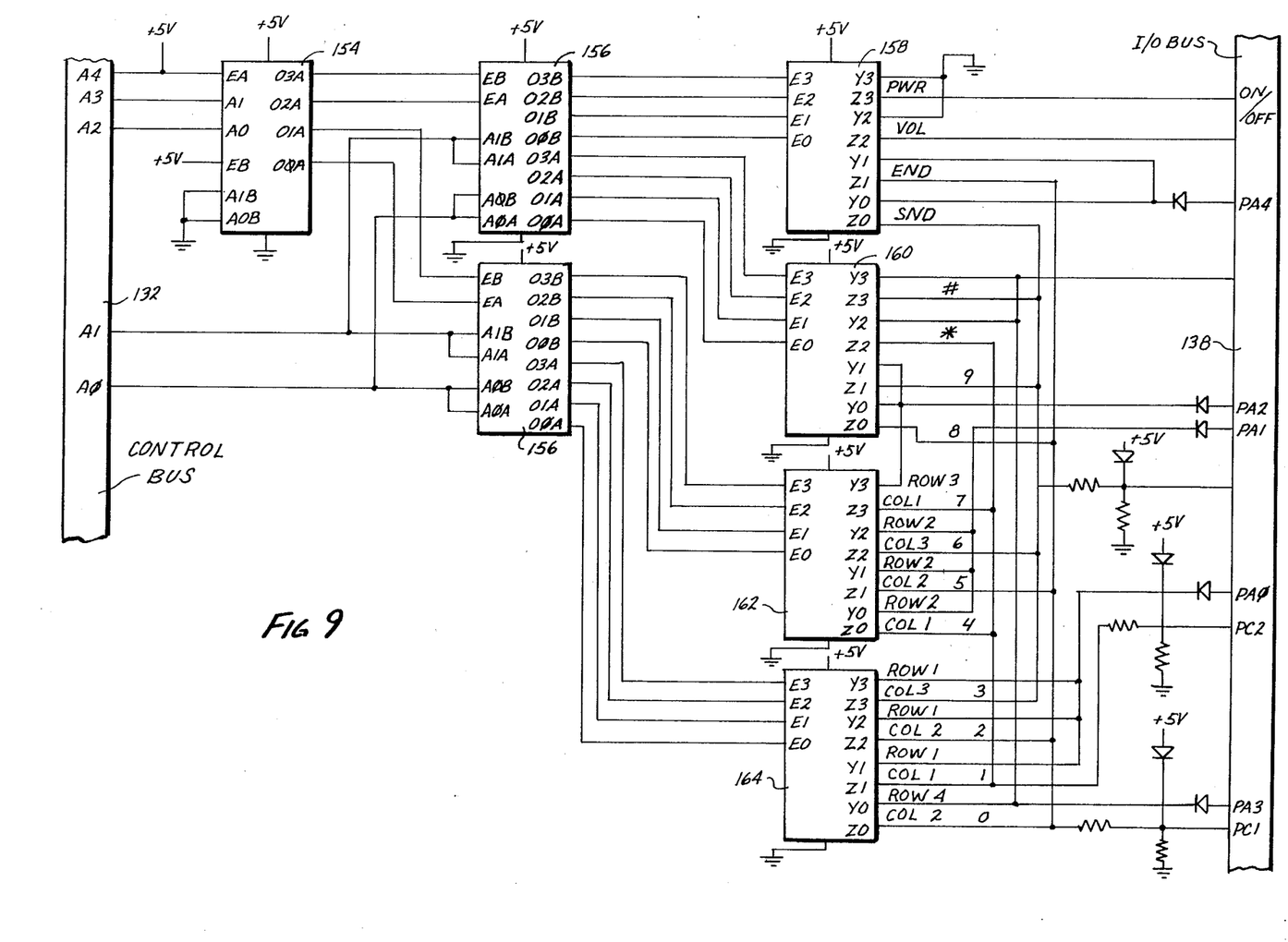
FIG. 9 a schematic diagram of decoder circuit used to communicate between the microprocessors on the controller.

Turn now to FIG. 9 wherein signals, A0–A4, generated on control bus 132 by microprocessor 118 are converted into row and column key pad signals which can be understood by transceiver 44. The signal A4 on control bus 132 corresponding to the output from terminal PA4 of microprocessor 118 is an enable signal used to enable decoder 154. Decoder 154 is driven by the control signals A2 and A3 corresponding respectively to terminals PA2–3 of microprocessor 118. The output of decoder 154 are intermediate inverted decoding signals EA and EB. These signals are output in parallel to a second stage of two decoders 156 which have as additional inputs, control bus signals A0 and A1 corresponding respectively to terminals PA0–1 of microprocessor 118. Ultimately the five control bits A0–A4 will be converted into twelve key pad signals corresponding to the twelve buttons on a telephone key pad corresponding to digits 0–9, *, and #, and two additional related radiotelephone signals ON/OFF and volume control, VOL CONT. Thus, bits A0–A3 represent sixteen possible combinations with a four-bit word which is decoded in two stages in decoders 154 and 156 and coupled as sixteen discrete output signals to the inputs of analog switches 158–164. The A4 bit either disables all sixteen outputs or enables the one of sixteen outputs as designated by the A0–A3 bits. Consider for example analog switch 164. The four inputs to analog switch 164 correspond to the key pad numerals 0–3. With respect to each of these numerals, two signals will need to be generated in order to command transceiver 44, namely the row and column designations corresponding to key pad numbers 0–3. In particular, numeral 0 is located in the second column and fourth row. Therefore, the first two outputs of analog switch 164 correspond to column 2, row 4 and will be activated in response to activation of one of the inputs to analog switch 164, such as E0. The pairs of outputs corresponding to numerals 1, 2 and 3 are similarly activated. In the same manner the outputs of analog switch 162 correspond to the row and column pairs corresponding to key pad numerals 4–7. Analog switch 164 similarly includes as its outputs key pad numerals 8 and 9, * and #. The outputs of analog switch 158 are peculiar to radiotelephones, which comprise a fifth row. The fifth row on a radio telephone corresponds in the second column to the signal END and in third column to the signal SND. Included as discrete signals are the control signals volume, VOL, and power, PWR, which are also referenced in FIG. 9 as the input/output signals on bus 138 as VOL CONT and ON/OFF, respectively. Each of the row and column signals from switches 158–164 are active low and are appropriately buffered and coupled through diodes and resistors according to conventional principles as illustrated in FIG. 9 to I/0 bus 138. By this means microprocessor 118 can arbitrarily manipulate and control radiotelephone transceiver 44.

Figure 10:
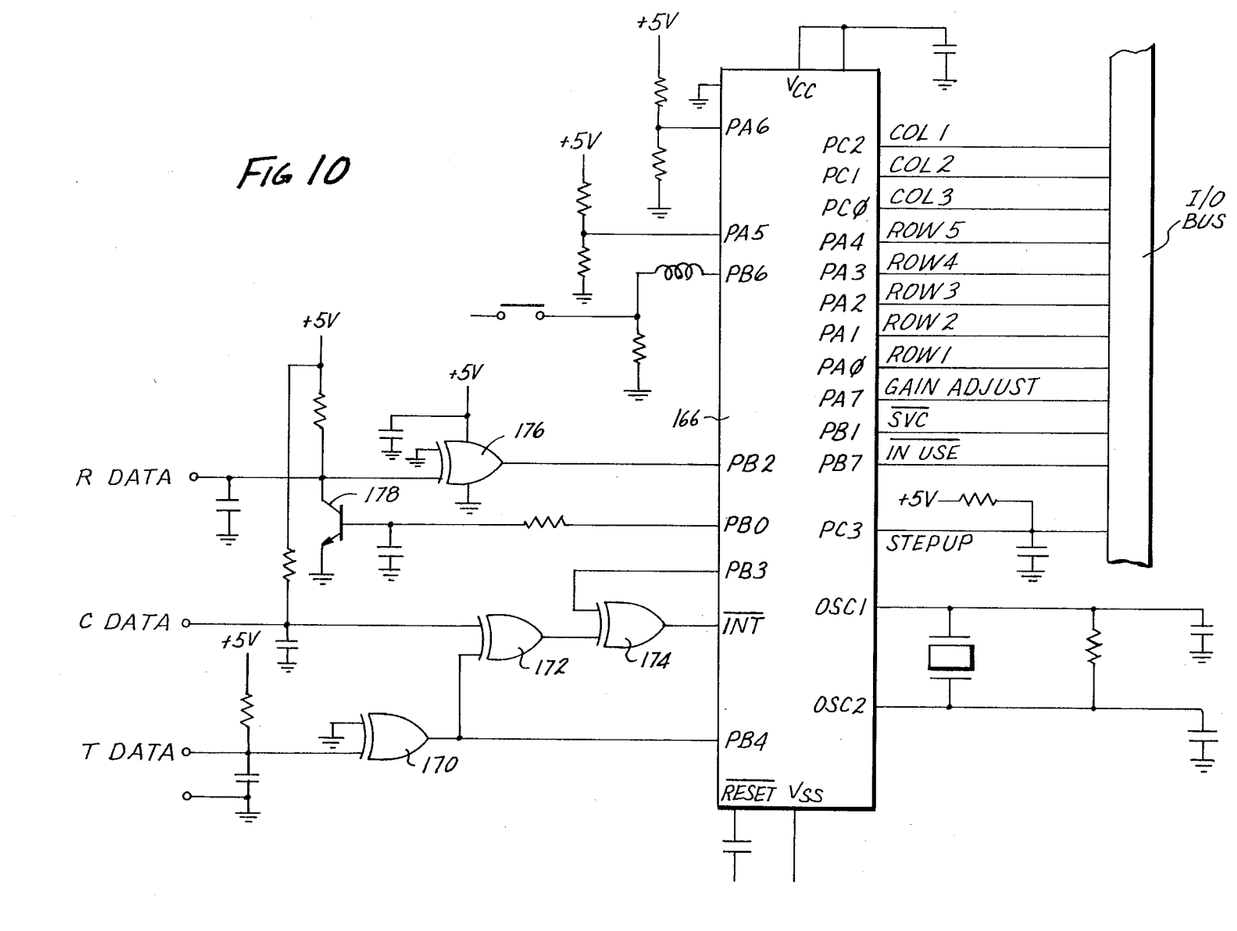
FIG. 10 is a schematic diagram of a circuit for coupling signals between the transceiver and one of the microprocessors on the controller.

Turning how to FIG. 10, a microprocessor 166, run by crystal controlled clock 168, allows signals received by transceiver 44 to place signals of the input/output bus 138. Microprocessor 166 interfaces the circuitry and buses described above with the unique signals used by transceiver 44 and to that extent is transceiver dependent. The signals, return data, R DATA; complementary data, C DATA; and true data, T DATA are signals specific to the Motorola transceiver 44 and are digital signals which are transmitted between transceiver 44 and the controller.

Each of these signals is coupled through appropriate logic circuits to input ports of the microprocessor 166. For example, T DATA, an input signal to microprocessor 166, is coupled through an exclusive OR gate 170 acting as a buffer since one input is held low. The output of gate 170, which is T DATA, is also coupled to input port PB4 of microprocessor 166. C DATA and buffered T DATA output from gate 170 are provided as the inputs to exclusive OR gate 172. The output of gate 172 is thus true whenever T DATA or C DATA are true but if in an idle state they both go true, the output is false. Thus, the output of gate 172 is true whenever data is being transmitted on the three wire bus and is false when the bus is in the idle state or reset state. The output of gate 172 is provided as an input in turn to exclusive OR gate 174 whose other input is coupled to an interrupt port PB3 of microprocessor 166. The output of gate 174 is coupled to the inverted interrupted terminal, INT, of microprocessor 166. This terminal will be active whenever data is being received from the transceiver. PB3 port acts as an internal acknowledgement signal. The output of gate 172 will be low when the data link is idle and will be high when it is busy. Therefore when PB3 is high, the inverted interrupt, INT, will go active low when data comes in. This will cause an interupt to be executed in microprocessor 166 to enable it to receive data.

Finally, R DATA is similarly coupled to the output of transistor 178. Transistor 178 is in turn driven by output PB0, which is the data output from microprocessor 166 to transceiver 44. An input of exclusive OR gate 176 is also coupled to the output of transistor 178 and gate 176 acts as a buffer. Therefore, the output of buffer gate 176 is the signal, R DATA, which is applied to input port PB2 for the purposes of timing.

Consider briefly the timing protocol used on the three wire bus. Normally, the bus is in a reset state, i.e. C DATA and T DATA are both false. When either one changes microprocessor 166 will be interrupted. The message appearing on the T DATA line contains a bus direction field, destination address field and data field. When microprocessor 166 initiates communication, R DATA data will go low indicating a request from processor 166. A logic unit in the transceiver will establish bus direction and will expect to receive a message on the R DATA line. The message then display on R DATA includes a source address field, destination field and data field. When the request for service is answered by the transceiver, processor 166 will read the R DATA line and the destination address field of the incoming message. Processor 166 will place a first bit of R DATA on the line at the start of a data state. During communication initiated by the transceiver the first data bit will appear on the R DATA line after the bus goes from the reset state to the data state. The remaining data will appear on the R DATA line during the idle state to data state transition period. The last data bit of the message will be held on the R DATA line a few microseconds after the T DATA and C DATA lines have returned to the reset state to allow the bit to be read by the control unit. During a communication initiated by processor 166, processor 166 will hold the first data bit on the R DATA line until T DATA and C DATA lines enter a data state at which time another bit is sent. At the occurrence of each idle state, processor 166 will read the R DATA line through gate 176 and compare it with what is being sent. If there is a conflict, processor 166 will stop sending and vacate the bus. Processor 166 will request service again when the bus returns to the idle state.

Consider now the remaining output terminals of microprocessor 166. The outputs PC0-PC2 correspond to columns 3 through column 1 of the key pad respectively; outputs PA0-PA4 corresponding to rows 1-5 of the key pad respectively; and signals PB1 or SVC (service), and PB7 or IN USE described above can be selectively generated coupled to input/output bus 138. PA7 is a GAIN ADJ signal described below in connection with FIG. 11 used to adjust audio signal strengths in the voice channel. PC3 is coupled to a push button switch which can be manually operated by the call box user to step up the audio strength of the received voice communication.

Figure 11:
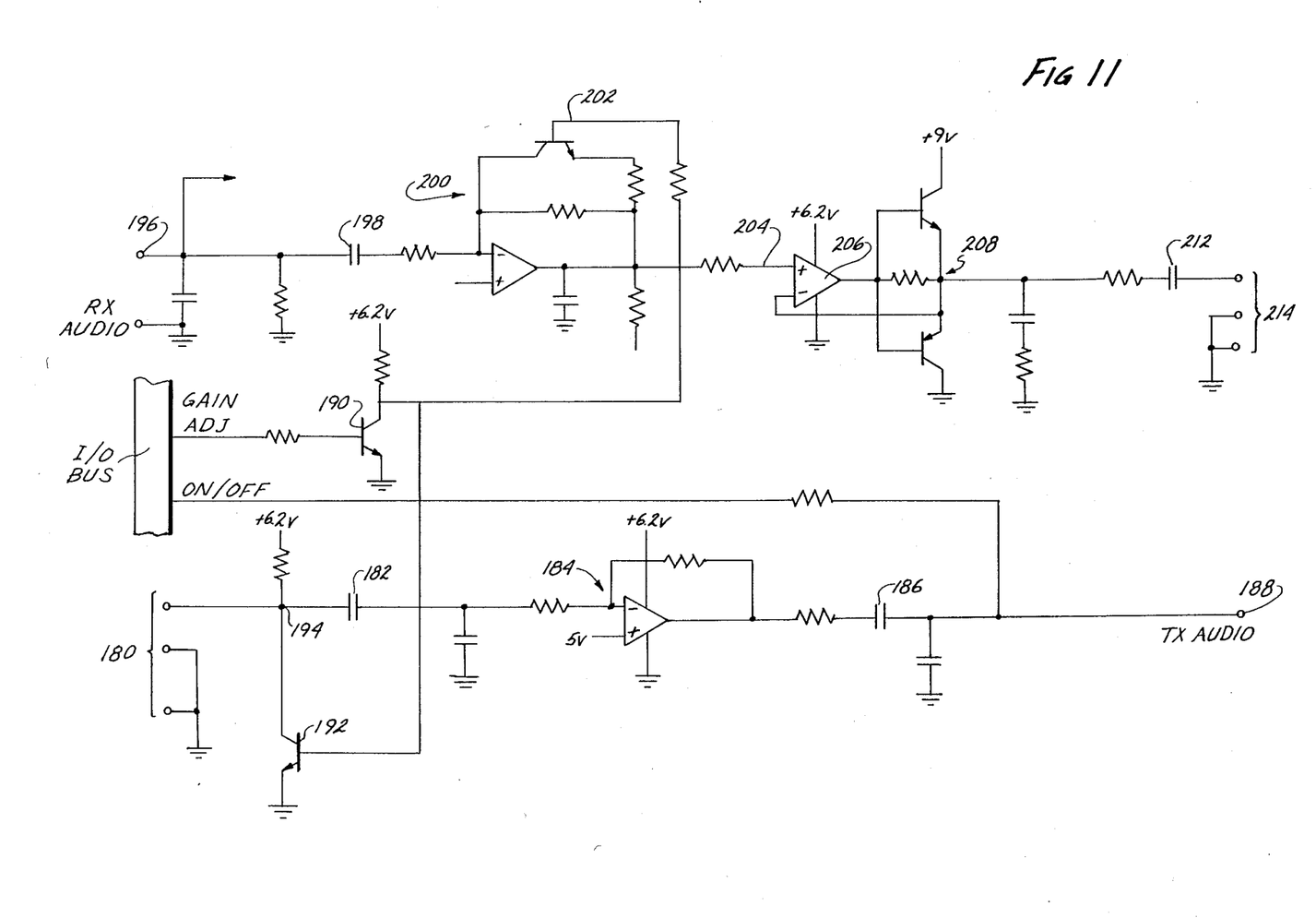
FIG. 11 is a schematic diagram of an audio level adjust circuit which can be controlled by a remote central processor.

Turn now to FIG. 11 wherein the circuitry illustrative of audio processing is illustrated. The microphone input of hand set 40 is coupled across terminals 180. The audio signal for the caller is thereby coupled through coupling capacitor 182 to an audio amplifier, generally referenced by numeral 184. The output of audio amplifier 184 is coupled through coupling capacitor 186 and provided as an output at node 188 as the transmitted audio, TX AUDIO.

ON/OFF is a toggle signal on I/O bus 138 as described in FIG. 7 and is similarly coupled through limiting resistor 190 to node 188 to override the transmitted audio signal according to microprocessor 166 to cause the transceiver to be turned on or off. Thus, grounding the on/off line at I/0 bus 138 causes the transceiver power to be turned on if it is off or to be turned off if it is on.

Similarly, audio volume control or a gain adjust signal, GAIN ADJ, is provided from I/O bus 138 through signal PA7 of microprocessor 166. This is a gain adjust signal coupled through transistors 190 and 192 thereby biasing node 194 at the input side of audio capacitor 182 to a point appropriate with the desired audio gain. Thus, the remote central controller can advise call box 10 to turn up the microphone volume as needed through the manipulation of the T, and C DATA signals coupled to microprocessor 166 which then appropriately generates the gain adjust signal, PA7.

Similarly, the received audio from the remote central operator is coupled to terminal 196. Again, the received audio signal is coupled through an audio capacitor 198 into an audio amplifier generally denoted as reference numeral 200. The feedback of audio amplifier 200 in turn is controlled through the transistor 202 by means of the gain adjust signal, GAIN ADJ, acting through the output transistor 190. Therefore, the received audio gain coupled to input 204 of differential amplifier 206 can be remotely operator adjusted through gain adjust signal GAIN ADJ. The output of differential amplifier 206 in turn is coupled to the input of a push/pull amplifier generally denoted by reference numeral 208. The output of push/pull amplifier 208 is coupled as the opposing input to differential amplifier 206 thereby maintaining the output 210 of differential amplifier 206 at a continual maximum. The output of push/pull amplifier 208 is in turn resistively coupled through audio capacitor 212 to the receiver or ear piece terminals 214 in hand set 40.

Solar array 34 is also coupled to battery 46 through controller 42 by means of a shunt regulator. The regulator is conventional and thus is not further shown in the Figures. Coupling through the shunt regulator prevents overcharging of battery 46 and thereby eliminates the potential of any damage due to overvoltages or overcharging.

The circuitry now having been generally described in connection with FIGS. 4-9, turn to the flow diagram of FIG. 12 which illustrates the basic operation of controller 42. Upon power-up as indicted by step 201, a master reset signal is generated to program control at step 203 to reset all chips within the circuit. This step generates any logic reset signals required by the microprocessors 118 or 166 or any other logic circuitry. In addition during this step the transceiver may execute any initial protocol operations. For example, in the case of the Motorola transceiver of the illustrated embodiment, the best ground station or forward control channel is selected. Service is then established between the selected forward control channel and the call box. The transceiver or microprocessor 118 then dials a preprogrammed telephone number and sends identifying codes which establish the call box's identity. These numbers and codes are verified and then communications is selectively established on a reverse channel when appropriate. All this is protocol which is normally handled by the cellular transceiver and ground station and do not strictly affect the operation of the invention as described here.

Thereafter, the outputs of each of the status chips are set to zero or initialized at step 205. This corresponds to the generation of various set signals shown as the output of decoder 130 and as described in connection with the latches of FIG. 8.

Having cleared and set each of the status latches, processor 118 then enters a self-test program to test the contents of memory 120 at step 207. Each self-test program is checked a predetermined plurality of times at step 209. The test is repeated until it successfully passes or a timeout occurs. Upon successful self-testing of memory 120, processor 118 will then read the various status signals as step 211 as described in connection with FIG. 8. Should the pole down signal, DWN, for example, be active as determined at step 213, processor 118 will then enter a specialized down routine at step 215 to take whatever appropriate remedial action or reporting as is desired in the case that the call box has been run over or otherwise down on the ground.

After the down routine is completed, or there is no pole down situation, processor 118 then determines at step 216 whether the battery level is low. If the power is low, it enters a power subroutine at step 218 and performs any remedial action necessary in response to low battery, such as unconditionally disabling the transceiver 44. Again, after execution of the low power routine or if the power is adequate, microprocessor 118 will then inquire at step 220 whether an emergency call is being placed. If an emergency caller is placing a call by lifting hand set 40 off the hook, an emergency call routine is entered at step 222 wherein transceiver 44 is powered up, a predetermined phone number is dialed or transmitted, together with specific identifying information uniquely identifying call box 10. After the call is completed, the processing again returns to step 210 where the status is reread.

If at step 220 an emergency call is not being placed, an inquiry will be made at step 224 as to whether or not a predetermined time interval has passed. In the illustrated embodiment call box 10 incorporates a twenty-four-hour flag. If a twenty-four-hour interval has not expired since step 224 was last queried, the processing will return to step 210. If on the other hand, twenty-four hours have elapsed since the last query at step 224, a call report status routine is entered at step 226. At step 226, microprocessor 118 will enter a predetermined subprogram to telephone the central processing unit regarding the status of call box 10. Thus, every twenty-four hours or on any other arbitrary schedule, each call box will call the central processing center, identify itself and report its current status or even a past log of activity.

Many modifications or alterations may be made by those having ordinary skill in the art without departing from the spirit and scope of the invention. For example, the operational routine described at FIG. 10 is illustrative only and any other means could be arbitrarily programmed into execution. It is to be expressly understood that a different cellular transceiver, such as an OKI model UM 1043B manufactured by OKI Electric Industries Co. Ltd of Atlanta, Ga., could be easily substituted for the illustrated Motorola transceiver with appropriate modifications to accommodate the substitution according to well know design principles.

Furthermore, it should be noted in connection with the circuit diagrams of FIGS. 4-9 that call box 10 incorporates a digital address bus, data bus, control bus and I/0 bus. Therefore, it is entirely within the scope of the art that such generalized bus structures can be employed with other digital circuitry to expand the operational capacities of call box 10. For example, a slow scan video circuit can be appropriately coupled to the buses if desired to provide visual information of traffic conditions at selected points. In addition, a data telemetry input subcircuit can similarly be coupled to the buses of call box 10 to allow, for example, for the transmission of digital medical data by paramedical emergency teams who may be attending an accident victim near the site of a call box. Such emergency medical data could be radio-telemetered from the accident site to the nearest call box which would then retransmit to the nearest hospital without the necessity of lifting hand set 40 off the hook or other direct wire coupling to the call box. The call box could similarly be time share with environmental sensing and reporting systems. Virtually any device which could benefit from a remote communications device could be easily combined and accommodated by the open bus structure of the invention. The adaptability of the invention is even further enhanced when it is realized that interactive digital and voice communications is facilitated through call box 10.

Therefore, the illustrated embodiment must be understood as being provided only for the purposes of example and clarity and not as a limitation of the invention as defined in the following claims.

I claim:

1. A system for emergency call box service comprising:

a plurality of emergency call boxes, wherein each call box further comprises a controller, a cellular transceiver coupled to said controller, a battery coupled to said controller for providing power to said controller and transceiver, and means for generating power coupled to said controller for recharging said battery; and     a cellular telecommunications subsystem in radio-telecommunication with each of said plurality of emergency call boxes, said cellular transceiver being remotely progammable, said controller for programming operation of said cellular transceiver in response to information receivied from said cellular telecommunications subsystem wherein said controller further comprises means for receiving and processing information to initiate operations in said controller, whereby said plurality of emergency call boxes can be installed which are capable of arbitrarily progammable interactive operations.

2. The system of claim 1 further comprising interoffice local telephone exchanges coupled to said plurality of call boxes wherein communication between said cellular telecommunication subsystem and said plurality of call boxes is selectively coupled through said interoffice local telephone exchanges.

3. An emergency roadside call box comprising:
a controller means for receiving remotely originated information;
a remotely programmable cellular transceiver coupled to and controlled by said controller, operation of said cellular transceiver being initiated at least in part by said remotely originated information received by said controller;
a battery for powering said controller coupled to said controller and transceiver; and
means coupled to said controller for recharging said battery.

4. The call box of claim 3 further comprising a subcircuit for monitoring a user request for emergency transmission.

5. The call box of claim 3 comprising a subcircuit for monitoring presence of a communication transmitted to and from said call box.

6. The call box of claim 3 further comprising means for selectively communicating a plurality of parameters of said call box to an off-site recipient.

7. The call box of claim 3 wherein said controller comprises means of conserving power from said battery when an emergency communication is not desired.

8. A method in an emergency roadside call box, said call box being battery powered and coupled through a radio-telecommunication link to a cellular telecommunication system and communication applications processor, said method comprising the steps of:
reading a plurality of call box status parameters at a plurality of call boxes;
sending information from said communication application processor or cellular telecommunication system to selectively perform a remedial routine in response to said step of reading said plurality of status parameters dependent upon the condition of each corresponding parameter in order to render said call box operational;
selectively receiving said information at said plurality of call boxes;
selectively entering an emergency call routine wherein a cellular telecommunications transceiver within said call box is powered up and bidirectional voice communication is established through said cellular telecommunication system to said communication applications processor,
whereby remotely powered emergency call boxes in radiotelecommunication with said communication applications processor are operationally maintained.

9. The method of claim 8 further comprising the step of selectively reporting said plurality of status parameters from each said call box through said cellular telecommunication system to said communication applications processor.

10. An apparatus in combination with a cellular radiotelephone for generating information compatible with said cellular radiotelephone in an emergency call box comprising:
first means for determining a plurality of status conditions relating to said emergency call box;
second means for controlling power usage of said emerency call box to minimized power usage; and
third means for processing said status conditions determined by said first means and responsive to at least said second means, said third means for selectively bidirectionally communicating cellular radiotelephone compatible signals, said third means being coupled to said first and second means and to said cellular radiotelephone, said third means being remotely programmable to selectively process said status conditions and to selectively communicate said cellular radiotelephone compatible signals and selectively communicate said cellular radiotelephone compatible signals and selectively operate said apparatus in response thereto.

* * * * *